United States Patent [19]

Remington et al.

[11] Patent Number: 4,604,838
[45] Date of Patent: Aug. 12, 1986

[54] MODULAR MEZZANINE STRUCTURE FOR A STORAGE FACILITY AND METHOD OF ASSEMBLY

[75] Inventors: John L. Remington, Coplay; Jon A. Boyer, Allentown, both of Pa.

[73] Assignee: The Stanley Works, New Britain, Conn.

[21] Appl. No.: 548,504

[22] Filed: Nov. 3, 1983

[51] Int. Cl.$^4$ .............................................. A47B 45/00
[52] U.S. Cl. ...................................... 52/73; 52/236.3; 52/79.3; 52/286; 52/36; 52/745; 182/94; 248/220.3
[58] Field of Search ....................... 52/73, 77, 36, 182, 52/283, 286, 588, 236.3, 79.1, 79.3, 745; 446/476, 120; 211/208; 182/94; 248/220.1, 220.4, 220.3

[56] References Cited

U.S. PATENT DOCUMENTS

| 788,899 | 5/1905 | Grieves | |
|---|---|---|---|
| 2,003,876 | 6/1935 | Birtcher | 52/182 |
| 2,424,365 | 7/1947 | Needre | 228/45 |
| 3,225,487 | 12/1965 | Mallalieu | 446/476 |
| 3,302,363 | 2/1967 | Frey | 52/73 |
| 3,595,510 | 7/1971 | Hutchinson | 248/235 |
| 3,641,729 | 2/1972 | Irvin | 52/588 |
| 3,643,607 | 2/1972 | MacKenzie | 52/588 |
| 3,957,240 | 5/1976 | Johansson | 248/214 |
| 3,981,109 | 9/1976 | Termohlen | 52/283 |
| 4,119,176 | 10/1978 | Verdu | 182/138 |
| 4,312,086 | 1/1982 | Bianco | 248/220.3 |
| 4,355,700 | 10/1982 | Matthews et al. | 182/83 |

FOREIGN PATENT DOCUMENTS 258379 5/1963 Australia ............................. 446/476

Primary Examiner—John E. Murtagh
Assistant Examiner—C. Dennison
Attorney, Agent, or Firm—Woodcock Washburn Kurtz Mackiewicz & Norris

[57] ABSTRACT

A modular mezzanine structure for ready attachment to preexisting storage cabinet structure is disclosed. Angle brackets attached to supporting feet are provided. The feet are inserted into apertures conventionally formed in the cabinets. Platforms may then be assembled upon the angle brackets. A stairway and landing may similarly be attached to the cabinet structure for providing ready access to the platform thereof.

11 Claims, 7 Drawing Figures

MODULAR MEZZANINE STRUCTURE FOR A STORAGE FACILITY AND METHOD OF ASSEMBLY

FIELD OF THE INVENTION

This invention relates to a mezzanine structure comprising walkways, stairways, floor gratings, hand railings and associated structure which can be conveniently and readily added to preexisting industry-standard storage units. More particularly, the invention relates to a way in which such mezzanine structure can be attached to preexisting storage units with a minimum of drilling and other use of tools, these steps being avoided by the mezzanine structure being designed so as to be supported by structure already comprised by the storage cabinets.

BACKGROUND OF THE INVENTION

It is well known that in many industrial applications space is at a premium, particularly storage space in warehouses, plant tool rooms and the like, and accordingly, there have been developed numerous systems for storage of various goods. In many cases, these have become industry standard so that, for example, cabinets comprising drawers of one manufacturer can be stacked or assembled with those of another manufacturer. Typically, these will be stacked higher than one can conveniently reach, so some means must be provided to provide access to the upper levels of storage. This may comprise such things as a "rolling stair," a flight of stairs mounted on casters. Typically, the casters are spring-loaded so that when one steps on the stairs, the casters retract into the supporting structure so its feet contact the floor, preventing rolling. However, this system is not always convenient. In particular, it would be desirable if permanent stairways and platforms could be provided to reach the upper level of storage structures so as to avoid use of the rolling stairs and the floor space they inevitably must take up. Furthermore, such permanent structure would simplify operations by permitting two persons at once to access the upper level of storage, whereas usually only one person at a time can employ a rolling stair.

Obviously, it would be desirable if such a mezzanine structure, i.e., a platform at height convenient to allow one to access upper levels of shelves in a relatively tall storage system, could be provided in as efficient and inexpensive fashion as possible. In particular, it would be desirable if such a system could be provided which could be added to preexisting storage structure without drilling or other machining operations, that is, by interacting with structure already found in industry-standard storage units.

OBJECTS OF THE INVENTION

It is therefore an object of the invention to provide a mezzanine structure comprising platforms, stairways and the like which can be added to preexisting storage structures without substantial modification thereto.

It is a further object of the invention to provide a mezzanine structure comprising platforms, stairways, railings, gratings and the like which can be added to preexisting storage units in a fast, foolproof, efficient and modular fashion so that varying mezzanine structures can be fabricated and stocked by their manufacturer and supplied as ordered, rather than requiring special construction for each order.

SUMMARY OF THE INVENTION

The above needs of the art and objects of the invention are met by the present invention which comprises a mezzanine structure in which support for the mezzanine structure against gravity is provided by feet which fit into preexisting openings which are found on all presently-available storage cabinets. One manufacturer, for example, provides apertures for insertion of the tines of forklift trucks. Where the load to be carried by the feet is uniform, as, for example, between the two sides of a platform supported between paired opposite ranks of storage cabinets, no additional fasteners need be provided. Where an overhung load, such as a landing on the rear side of a row of cabinets is provided, a single bolt or similar member preventing horizontal movement of each foot member with respect to the aperture is sufficient. A number of different modular units are provided according to the invention which can be used to effectively satisfy any desired combination of storage and mezzanine structures.

BRIEF DESCRIPTION OF THE DRAWINGS

The invention will be better understood if reference is made to the accompanying drawings, in which.

DESCRIPTION OF THE PREFERRED EMBODIMENTS

Figure 1:
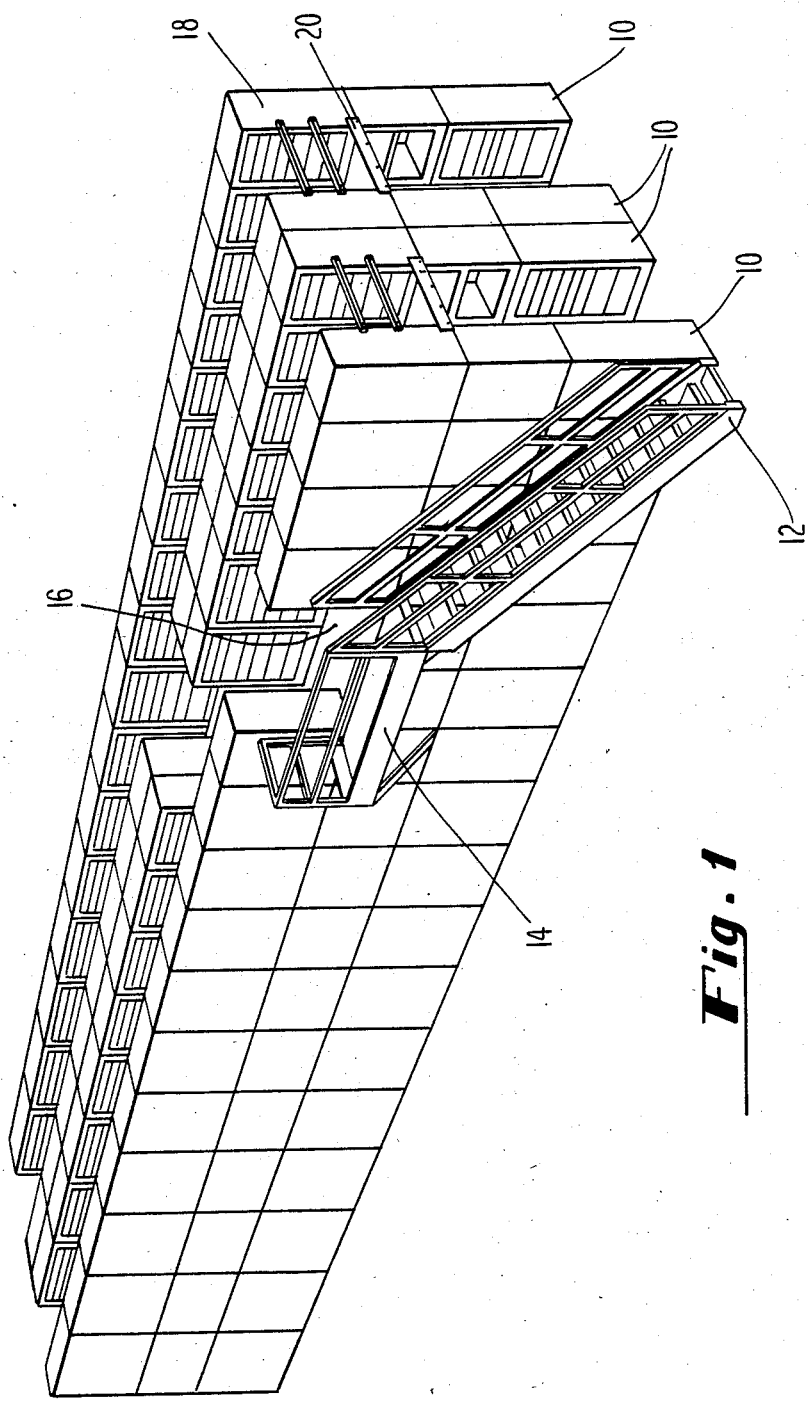
FIG. 1 shows an overall perspective view of a typical system of storage units to which mezzanine structure has been added according to the invention.

FIG. 1 shows four rows of stacked storage cabinets 10. These may include any sort of desired storage structure; drawers and shelves are shown, but of course, a wide variety of possibilities is available. According to the invention, a stairway 12 is added which communicates with a landing 14 which allows entrance to a platform 16 extending between two of the rows 10 of stacked cabinets. In this way, someone desiring something stored in one of the drawers in the upper level of cabinets 10 can simply climb the stairs 12 and walk onto the mezzanine platform 16. This simplifies access to these upper drawers. By comparison, in a rolling stair system, the rolling stair will ordinarily only be useful by one person at a time because two people will ordinarily not be seeking access to the same bank of drawers simultaneously. According to the system of the invention, a large number of people can simultaneously be accessing the upper level of drawers. A time saving is also inherent in the system of the invention because one need not first retrieve the roller stairway from wherever it had been before, roll it to where the drawer now to be accessed is located, and only then climb the stair. According to the present invention, one can simply climb the stairway 12 and walk directly to the drawer to be accessed. Accordingly, it will be seen that provision of a permanent stairway system, preferably according to the invention, is desirable and leads to efficiency of both storage and retrieval of items stored.

Also shown in FIG. 1 are end members indicated at 18 which may comprise railings at the end of corridors formed by platform 16. Kickplates 20 may also be provided.

Figure 2:
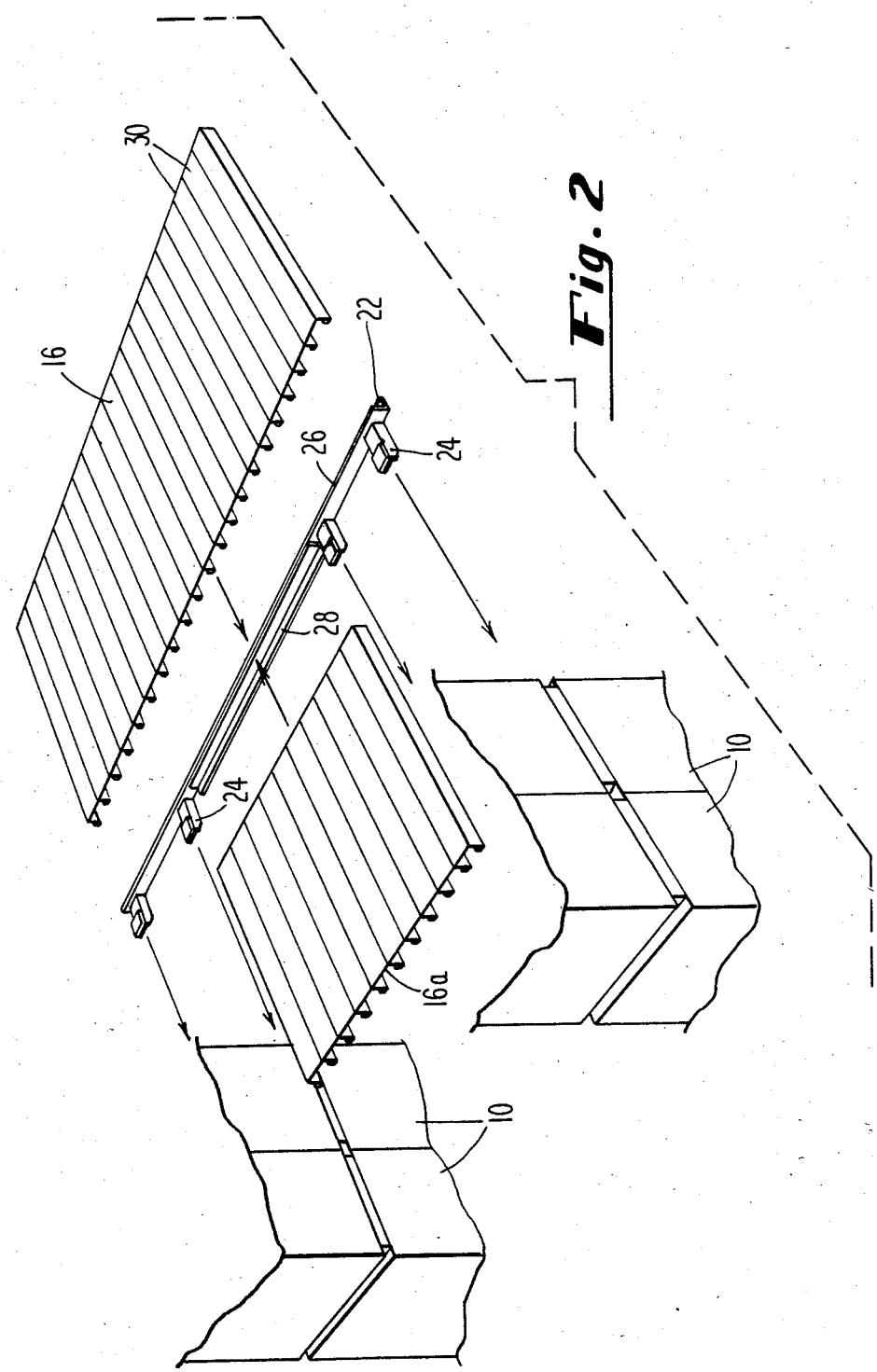
FIG. 2 shows how a platform or walkway can be added between two banks of storage cabinets creating a mezzanine platform floor.

FIG. 2 shows a preferred way in which platforms 16 can conveniently be attached to cabinet structures 10. Typically, brackets 22, comprising angle members 26 and 28 and feet 24 are provided. The feet 24 are sized and shaped so as to fit into apertures previously existing in cabinet structure 10. Since the spacing and size of these apertures is not standardized in the industry, the spacing and shaping of the feet 24 must vary in accordance with the cabinet to which mezzanine structure according to the invention is to be used. However, this does not prohibit utility of this method of adding mezzanine structure, because the number of manufacturers is limited so that only a few different aperture arrangements need be accommodated. In use, typically paired brackets 22 would be applied to facing sets of storage structures 10 and a platform 16 constructed between them. If the bracket 22 has angles 24 and 26 on both sides as shown in FIG. 2, an additional facing platform 16a can also be added between columns which are separated by some distance, as also shown in FIG. 2. In this way, a complete mezzanine structure can be built up. Typically, the platforms 16, 16a are built up out of individual slat members 30 in a manner detailed below in connection with FIGS. 4 and 5; however, the brackets will accept other platform surfaces, such as open bar grating, plywood over corrugated steel decking, etc.

Figure 3:
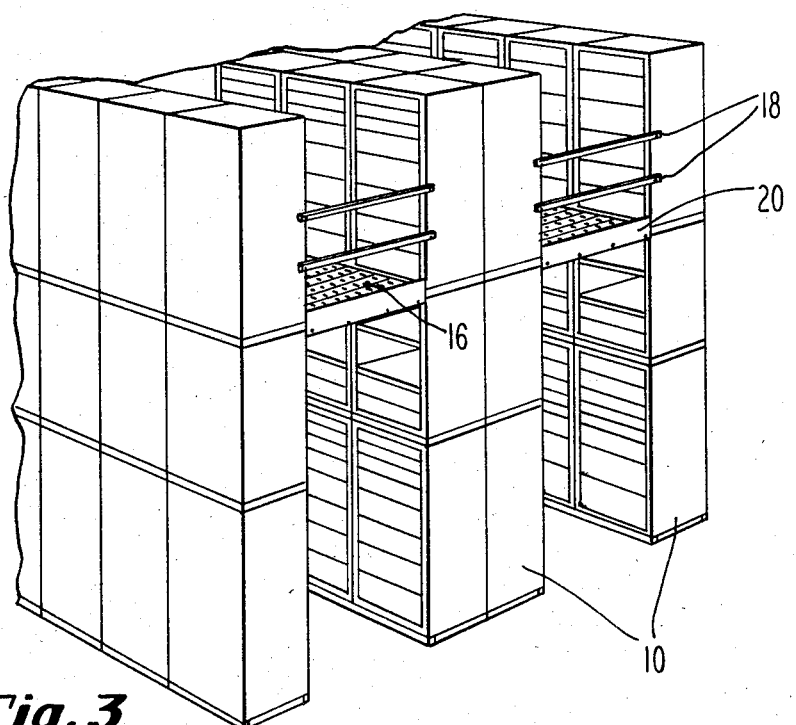
FIG. 3 shows a second perspective view detailing mezzanine floor structure between a plurality of storage cabinets.

FIG. 3 shows one possible end structure of a mezzanine added to preexisting storage cabinets 10 according to the invention. Two end rails 18 are provided at the end of each mezzanine corridor as is a kickplate 20. These are obviously useful for safety reasons.

Figure 4:
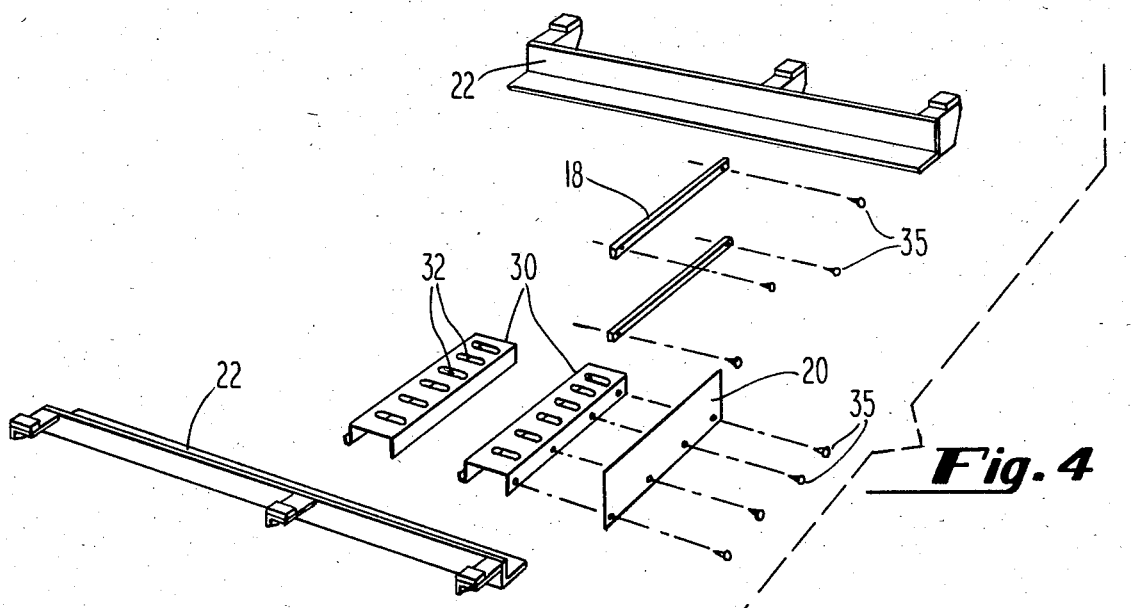
FIG. 4 is an exploded view showing how the floor of FIG. 3 may be assembled.
Figure 5:
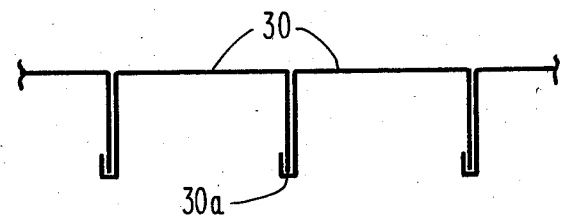
FIG. 5 is a schematic cross-sectional view showing how members of the floor of FIGS. 3 and 4 interlock.

FIGS. 4 and 5 show the way in which individual slat members 30 can be assembled to form a platform 16 (FIGS. 1 through 3). The individual slat members will typically be of generally inverted U-shaped sheet metal construction. They may be provided with apertures 32 in their upper surfaces; the slats can also be formed with portions of the sheet metal uplifted. Both apertures and uplifted portions are designed to ensure good footing for those walking on the platform 16 formed thereby. FIG. 5 shows the way in which the U-shaped members 30 can interact with one another by means of a J-shaped detail 30a formed on one leg of each U-shaped member 30. The J-shaped details 30a interact with the other legs of adjoining slats 30 to form a strong, self-supporting structure. It will be appreciated by those skilled in the art that the provision of the J-shaped detail 30a will provide an additional transverse stiffness to the slat as compared with a simple U-shaped slat. The interaction of the J-shaped detail 30a with the associated leg of the adjoining slat 30 also serves to lock the slats 30 together into a solid, tight-fitting, safe unit. FIG. 4 also shows how the kickplates 20 can be added to the endmost slat of a unit by means of sheet metal screws 35 fitting into holes preferably predrilled in the kickplate 20, and in one end slat 30, and also shows how the end rails 18 can be attached to the cabinets 10 (FIG. 3), again by means of sheet metal screws 35. The slat members 30 are simply dropped into place, one after another, between the angle members of the paired brackets 22, and rest thereon, forming a unitary platform structure 16.

Figure 6:
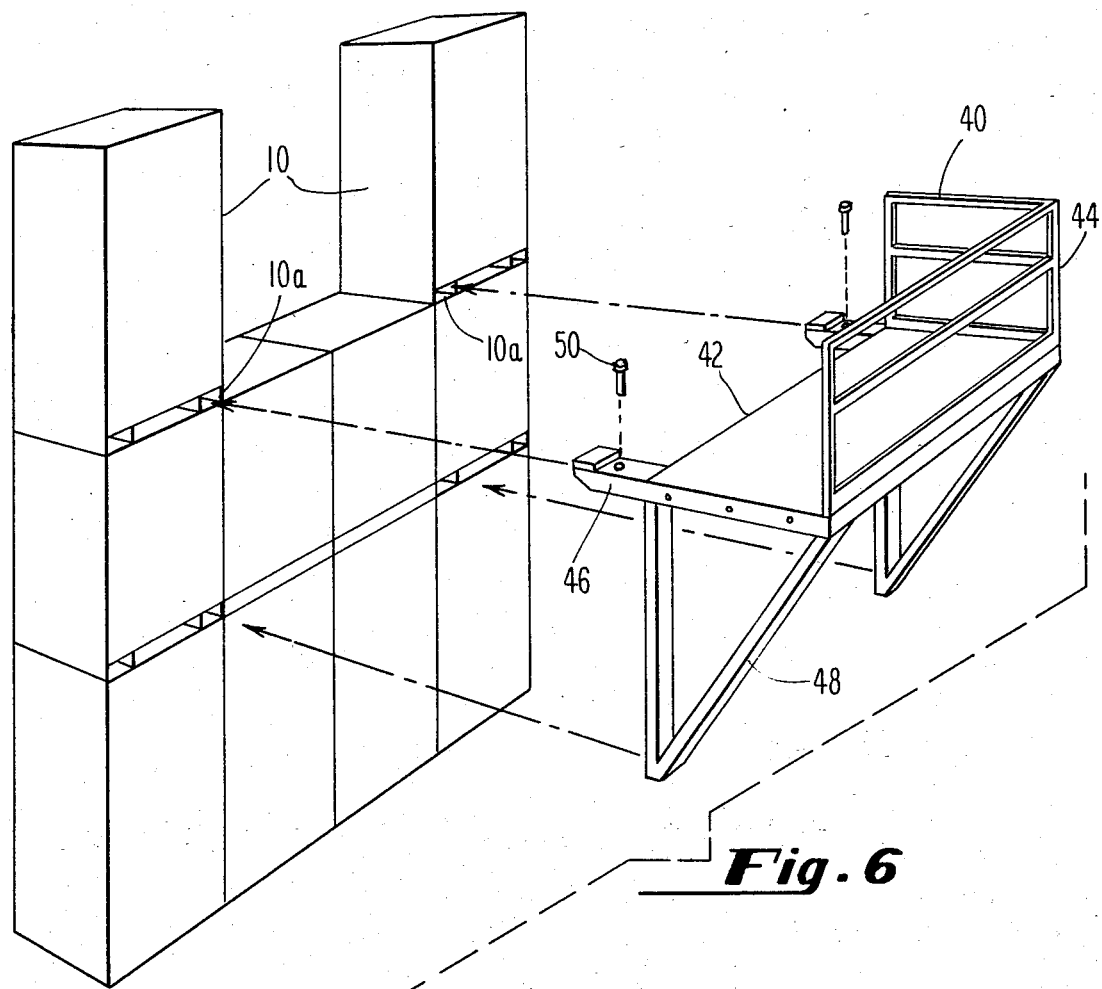
FIG. 6 is an exploded view showing how a cantilevered landing can be added onto the rear side of a row of storage units.

FIG. 6 shows a way in which a landing member 40 may be attached to the rear side of an end of a corridor, which may be useful in a variety of applications. Again, the basic structure is a platform 42 provided with railings 44 on two or three sides. It is held into the storage containers 10 and is supported by feet members 46. It may be braced against collapse by angle brackets 48. In this embodiment, unlike the platform member structure detailed above in connection with FIG. 4, there is an unbalanced, horizontal component of force due to the weight of the platform 40 and that of any individual walking thereon. Accordingly, it is desirable that a bolt member 50 be provided in a manner detailed below in connection with FIG. 7 to ensure that this horizontal component of force does not result in the platform 40 moving horizontally a distance sufficient to detach the feet 46 from the apertures 10a of the storage cabinets 10.

Figure 7:
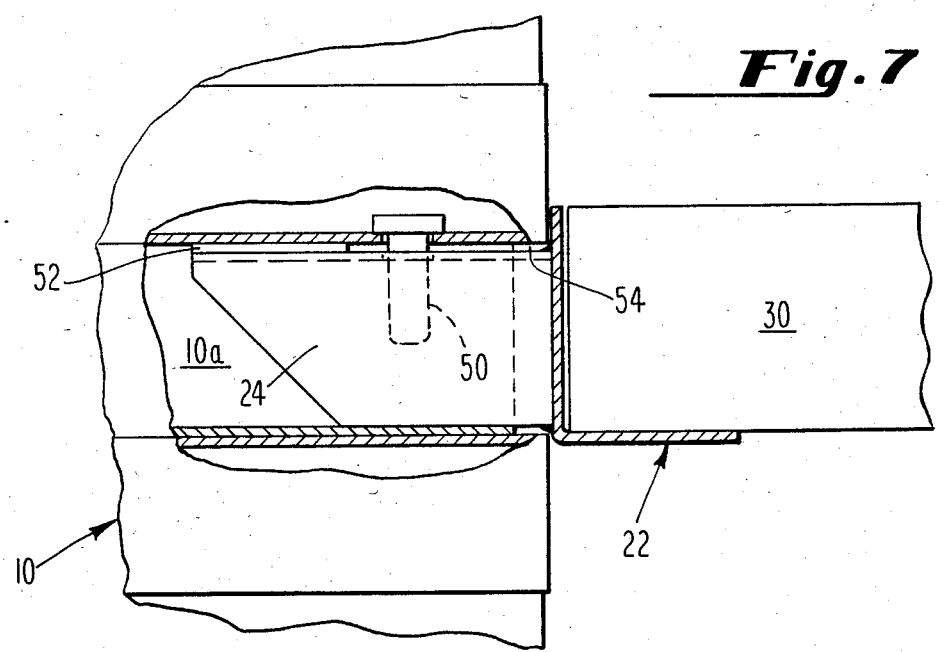
FIG. 7 is a cross-sectional view showing how the support foot fits in an aperture in the storage structure and how fasteners can be used to prevent horizontal movement of the support foot.

FIG. 7 shows how the feet 24 of the bracket 22 interact with the apertures 10a of the cabinet structure 10. The foot 24 can be formed of conventional angle or channel material and may have an additional pad 52 attached thereto, e.g., by welding. If necessary, an additional shim 54 may be used to ensure that the foot structure 24 and angle structure 22 is level, thus providing a flat base upon which the slats 30 making up the platform 16 (FIGS. 1-3) may rest. The bolt 50 is shown as well. This may be used, as mentioned above, in connection with asymmetrical loads, such as inherent in the landing design 40.

The staircase 12 is preferably affixed to a similar landing 14 by means of bolt and nut fasteners.

It will be appreciated that there has been described a mezzanine system which meets the objects of the invention and needs of the art discussed above. The use of preexisting apertures in the cabinets provides a ready way in which a mezzanine structure can be added to preexisting cabinets. While the aperture dimensions and spacing are not standardized, the various designs shown can all be accommodated by variation of the angle bracket member 22. Other elements of the system can be constructed in a modular fashion and sold "off the shelf"; that is, as opposed to special manufacture of each mezzanine system ordered. Use of the feet fitting into the apertures also permits an easy way for the system to be supported against the force of gravity. The aperture's vertical sizing interacts with the vertical dimension of the foot to ensure that a load placed on the angle member to which the foot is attached will cause the foot to firmly engage the underside of the aperture in the cabinet structure 10, so that it will be firmly and safely supported. Where the loading is symmetrical between two opposed angle members, for example in the case of a corridor extending between two cabinets, no additional fasteners need be used to secure the feet within the apertures. Their weight will provide friction sufficient to prevent the feet from moving. Only where the load is unbalanced, as in the case of a landing built on the end of a row of cabinets, need additional fasteners be provided. to prevent horizontal movement of the foot with respect to the aperture.

It will be appreciated that while a preferred embodiment of the invention has been described, this is merely exemplary of its scope, which is more properly expressed by the following claims.

We claim:

1. A modular mezzanine structure for ready attachment to preexisting storage cabinet structure, the storage cabinet structure comprising a plurality of storage cabinets stacked one on top of the other to a predetermined height, the stacks being arranged side by side in rows and the rows being parallel to each other in face to face relation and spaced apart a predetermined distance, each of the storage cabinets in the rows being formed with preexisting spaced apertures therein, said modular mezzanine structure comprising modular support means for supporting said mezzanine structure, said support means comprising brackets of predetermined length and having feet attached thereto at spaced locations thereon, the length of said brackets being predetermined in relation to the width of the storage cabinets, said feet having dimensions and relative spacing therebetween corresponding to the dimensions and relative spacing of the preexisting apertures in the storage cabinets and adapted for insertion into the apertures to support said brackets, said brackets being paired for application to the facing rows of storage cabinet structures so that said brackets extend along the length of each of the facing rows, and modular platform means adapted for support by said brackets between the facing rows of storage cabinet structure.

2. The structure of claim 1 additionally comprising stairway means, and means for attaching said stairway means to the preexisting storage cabinet structure for communication with said platform means.

3. The structure of claim 2 wherein said stairway means is supported upon the preexisting cabinet structure by foot means extending into the apertures in the cabinet structure.

4. The structure of claim 1 wherein said feet are restrained from horizontal movement with respect to the apertures formed in the preexisting cabinet structure by providing symmetrical loading to said platform means, whereby no net horizontal force is supplied to said feet.

5. The structure of claim 1 wherein said feet are restrained in the apertures by additional fastener means preventing horizontal movement thereof.

6. The structure of claim 1 wherein said brackets of said support means comprise angle members providing generally flat opposing supports for supporting said platform means at extremities thereof.

7. The structure of claim 1 wherein said platform means comprises interlocking modular slat members.

8. The structure of claim 7 wherein each of said slat members is of generally inverted U-shaped in cross-section, and one leg of said U has a generally J-shaped detail formed thereon for receiving the other leg of an ajoining slat member whereby said slat members are interlocked together to form a substantially solid platform.

9. A method of providing a modular mezznine structure for ready attachment to preexisting storage cabinet structure, the storage cabinet structure comprising a plurality of storage cabinets stacked one on top of the other to a predetermined height, the stacks being arranged side-by-side in rows and the rows being parallel to each other in face to face relation and spaced apart a predetermined distance, each of the storage cabinets in the rows being formed with preexisting spaced apertures therein, said method comprising the steps of providing a plurality of sporting brackets of predetermined length and having feet attached thereto at spaced locations thereon, the length of the brackets being predetermined in relation to the width of the storage cabinets, the feet having dimensions and relative spacing therebetween corresponding to the dimensions and relative spacing of the preexisting apertures to support the brackets, selecting a number of brackets so that the combined lengths thereof correspond to the combined lengths of the facing rows of storage cabinet structures, applying the brackets to the facing rows of storage cabinet structures by inserting the feet into the preexisting apertures in the storage cabinets so that the brackets extend along the length of each of the facing rows for supporting a platform therebetween, and assembling a platform on the brackets.

10. A method of providing a modular mezzanine structure according to claim 9 with a modular platform including the steps of providing a plurality of modular platform members, each having a length corresponding to the predetermined spacing between the facing rows of storage cabinet structures and having their ends adapted for support by the brackets applied to the facing rows of storage cabinet structures, selecting a number of the modular platform members so that the combined widths thereof correspond to the length of the brackets and assembling the modular platform members in side by side relation with their ends supported by the brackets to form a substantially solid platform.

11. The method of providing a modular mezzanine structure according to claim 9 including the step of attaching a bracket to the rear of one of the facing rows of storage cabinets by inserting the feet of the bracket into the preexisting apertures in the storage cabinets to support a landing at the same level and in communication with the mezzanine platform, and supporting a stairway from the landing to provide access to the mezzanine platform from the bottom level of the stacks.

* * * * *